Aug. 23, 1932.   O. V. PAYNE   1,873,214
SEPARATOR FOR ELECTRICAL WARP STOP MOTIONS
Filed June 3, 1931
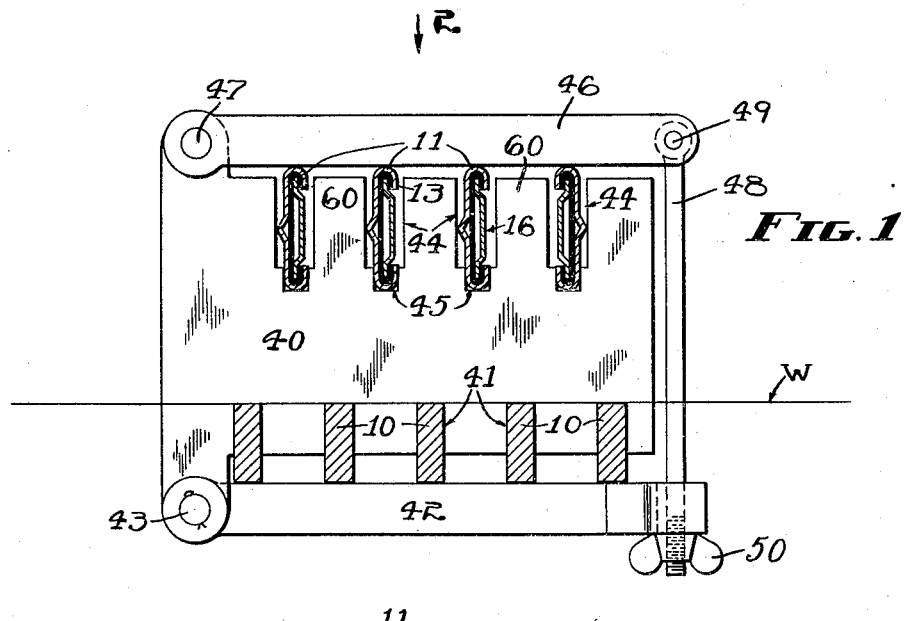
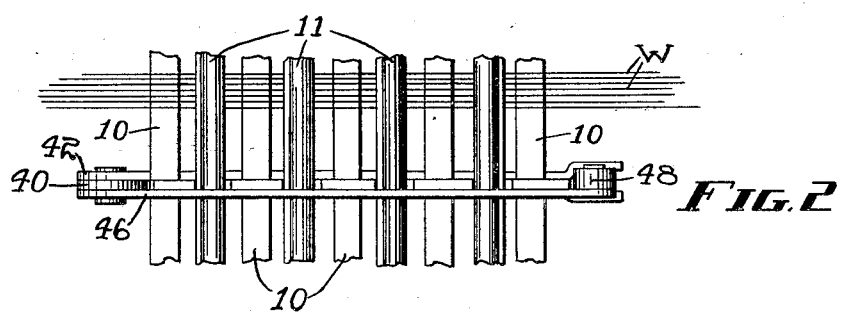
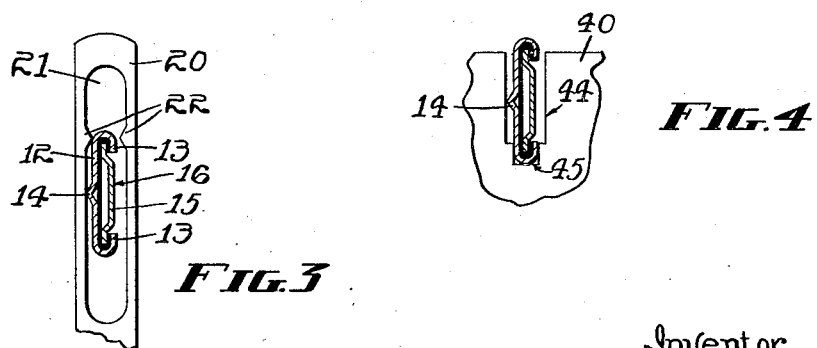
Inventor
Oscar V. Payne
Southgate Fay + Hawley
Attorneys Patented Aug. 23, 1932

1,873,214

UNITED STATES PATENT OFFICE

OSCAR V. PAYNE, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS

SEPARATOR FOR ELECTRICAL WARP STOP MOTIONS

Application filed June 3, 1931. Serial No. 541,849.

This invention relates to improvements in separators for electrical warp stop motions and it is the general object of the invention to provide a separator which may be clamped both top and bottom and so formed as to avoid short-circuiting of the oppositely charged electrodes of the contact bar.

In warp stop motions of wide looms it is found that the contact and separator bars are so long as to vibrate when the loom is in operation. In order to check this vibration, or keep the bars in the same relative position if they should move, it is customary to provide a so-called separator which is located approximately at the center of the motion. If the bars are quite long two or more of the separators may be located at spaced points across the width of the loom.

Electrical warp stop motions ordinarily comprise a bar having two electrodes one of which is alive with respect to the loom. When a separator is used with such a motion it is necessary to prevent such contact as would electrically unite the two electrodes. It is desirable that the various parts of the separator be made of metal to secure desired strength coupled with narrowness. It is to be understood that the warp threads lie on each side of the separator and for this reason the latter should be as thin as possible. It is a further object of my invention to provide a rugged durable separator which may be clamped tightly to the contact bars without danger of closing a circuit.

In certain applications already filed by me there is set forth a warp stop motion having a contact bar the top and bottom of which are grounded and formed of the same strip of material, the live electrode having a vertical exposed surface supported by and lying between the top and bottom of the other electrode. My invention is more particularly adaptable to a stop motion employing this type of bar, and it is a further object of my invention so to form the separator that the vertical live surface will at no time have contact with the separator.

With these and other objects in view which will appear as the description proceeds, my invention resides in the combination and arrangement of parts hereinafter described and set forth in the claims.

In the accompanying drawing wherein a convenient embodiment of my invention is set forth, Fig. 1 is a side elevation of a separator made according to my present invention showing the contact and separator bars in section, Fig. 2 is a top plan view of a motion for the part shown in Fig. 1 looking in the direction of arrow 2, Fig. 3 is a cross section of the contact bar and drop wire used in connection with my invention, and Fig. 4 is a fragmentary detail of a portion of the separator and a contact bar.

The warp threads W lie across a series of separator bars 10 which may be supported at their ends by structure not shown herein but well understood. Above the separator bars is located a series of contact bars 11 each of which, as shown more particularly in Fig. 3, comprises an outer inclosing sheath or grounded electrode 12, the top and bottom edges of which are bent over and toward the center of the bar as at 13. A rib 14 extends longitudinally along the bar preferably at a point half way between the top and bottom. The live electrode element 15 has a vertical exposed live surface 16 and is held in position by the bent top and bottom edges of the ground electrode. Suitable insulation separates these electrodes so that they are ordinarily out of contact with each other.

The drop wire 20 shown in Fig. 3 which is used with this style of bar has in the upper part thereof a slot 21 into which extends a pair of similar opposite lobes or the like 22. The lobes are so related to the rib that downward movement of the drop wire due to failure of its warp will cause engagement of one of the lobes by the rib, thereby effecting lateral movement of the other lobe into engagement with the surface 16. Ordinarily the live insulated electrode lies wholly within the cross-sectional outline of the grounded electrode 12, and the lateral movement of the drop wire is therefore necessary in order to complete the circuit.

The matter thus far described may be similar to that heretofore used by me and of itself forms no part of this invention.

My invention relates more particularly to a separating or bar spacing member which may be located at some point intermediate the ends of the bars so as to hold all of the latter in properly spaced relation. The separator comprises a body 40 which may be made of thin metal or the like and has downwardly opening slots 41 which partially surround the separator bars 10. A bottom cap 42 is hinged as at 43 to an extension of the body and lies in engagement with the under sides of the separtor bars.

The upper part of the body is provided with slots 44 each of which is reduced as at 45 at the bottom thereof as shown in Fig. 4. The top part of each of these slots 44 is of sufficient width to accommodate the ribs 14 and the lower part of the slot 45 is preferably substantially the same width as the bottom bent part of the contact bar, being centrally located with respect to the upper part of the slot. By this arrangement it is possible to place the contact bars in the slots in the upper part of the body 40 with the ribs either to the left as shown in the three contact bars at the left in Fig. 1, or with the rib to the right, as shown in the right hand contact bar of Fig. 1. Whatever the position of the contact bar there will be a substantial space between the insulated surface 16 and the adjacent wall of the corresponding slot 44.

A top cap 46 is pivoted as at 47 to an upwardly projecting extension of the body. A clamping link 48 is pivoted as at 49 to the free end of the cap 46 and may be provided with a winged nut or the like 50 which acts as shown in Fig. 1 to hold the top and bottom caps clamped against the bars when the winged nut is tightened on the link 48.

An important feature of the invention relates to means for preventing the live electrodes from engaging the separator even though the contact bars be tilted or inclined. To accomplish this result I extend the horns 60 between and defining the slots 44 to a sufficient height to lie opposite the top bent edge 13 of the grounded electrode 12. This relation, as shown in Fig. 1, would prevent engagement of a surface 16 with the body of the separator should the corresponding contact bar be somewhat inclined. The sides of the slots 44 are preferably made straight, as seen in Fig. 1.

From the foregoing it will be seen that I have provided a separator for use with relatively long contact bars so related to the latter that their component parts will be kept in proper electrical separation except at the time of warp fault. This result is accomplished partly by reason of the fact that the horns 60 project upwardly far enough to engage the folded over edges 13 at the top of the contact bar, the sides of the slots 44 being thereby kept out of possible contact with the live electrode 15. Also, the slots 44 have their lower ends reduced so as to position the contact bar with the rib either to the right or to the left. It will further be seen that the hinged cap may be made of strong material such as metal and at the same time be grounded to the turned over part of the outer member of the contact bar because of the fact that the top and bottom edges of this bar are of the same electrical tension.

Having thus described my invention it will be seen that changes and modifications may be made therein by those skilled in the art without departing from the spirit and scope of the invention and I do not wish to be limited to the details herein disclosed, but what I claim is:

1. In an electrical warp stop motion having an electric contact bar having a live surface on one side thereof and having grounded surfaces above and below the live surface, a separator having a body provided with a slot to receive the contact bar, the separator engaging the bar along the grounded surface only, the slot adjacent the live surface being sufficiently wide to keep the body out of contact with the live surface.

2. In an electrical warp stop motion, a plurality of electric contact bars each having a rib on one side and an insulated live surface on the opposite side, and a separator to space the bars, said separator having an opening for each bar, each opening having a notch therein of less width than the opening to receive a bar, the notch positioning the insulated live electrode spaced from the separator.

3. In an electrical warp stop motion, a plurality of electric contact bars each having a rib on one side and an insulated live surface on the opposite side, and a separator to space the bars, said separator having an opening for each bar, each opening having a notch therein of less width than the opening to receive a bar, the opening being of sufficient width to receive the bar with the rib on either side of the notch.

4. In an electric warp stop motion having separator bars to divide the banks of drop wires and position the warp, a contact bar having a live laterally exposed surface and an electrode extending above and below said surface, a separator member supported on the separator bars and having a spaced part to extend above the live surface into engaging position relatively to the upper part of the electrode to prevent engagement of the live surface and member.

5. In an electrical warp stop motion having a bank of drop wires and warp positioning bars on opposite sides thereof, a separator member supported on the bars and having spaced portions defining a slot, and an electric contact bar in the slot and having a lateral live surface, the contact bar being formed to engage one of said portions to prevent the latter from having contact with the live surface.

In testimony whereof I have hereunto affixed my signature.

OSCAR V. PAYNE.